United States Patent [19]
Estrate

[11] Patent Number: 5,241,154
[45] Date of Patent: Aug. 31, 1993

[54] SHIELD FOR MIG WELDER

[75] Inventor: Evan A. Estrate, Phoenix, Ariz.

[73] Assignee: Mig-it Inc., Phoenix, Arizona

[21] Appl. No.: 980,005

[22] Filed: Nov. 23, 1992

Related U.S. Application Data

[63] Continuation-in-part of Ser. No. 804,288, Dec. 6, 1991, abandoned.

[51] Int. Cl.⁵ .............................................. B23K 9/32
[52] U.S. Cl. ...................................... 219/147; 219/136
[58] Field of Search .................... 219/147, 136, 137.2, 219/138; 359/601; 266/903

[56] References Cited

U.S. PATENT DOCUMENTS

| 1,217,838 | 2/1917 | Schmidt . | |
| 2,235,594 | 3/1941 | Smith | 189/34 |
| 2,390,149 | 12/1945 | Hopper | 219/8 |

FOREIGN PATENT DOCUMENTS

| 43-1381 | 1/1968 | Japan | 219/137.41 |
| 364557 | 11/1962 | Switzerland | 219/147 |
| 129177 | 7/1919 | United Kingdom | 219/147 |

Primary Examiner—Clifford C. Shaw
Attorney, Agent, or Firm—Lynn G. Foster

[57] ABSTRACT

A shield for a welding torch. The shield can be adjusted to positions above, beneath, and to either side of the tip of the torch.

18 Claims, 2 Drawing Sheets

FIG. 2
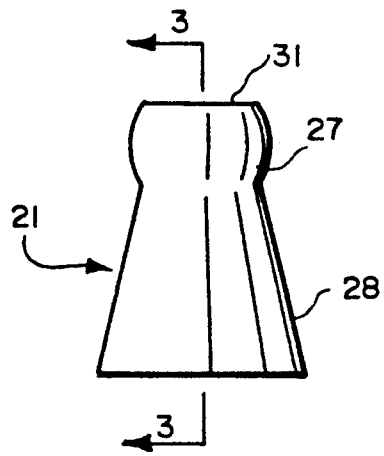
FIG. 3
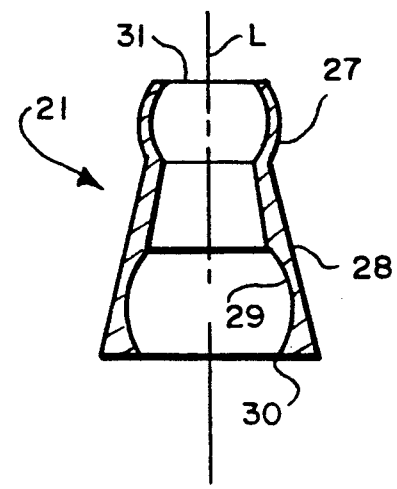
FIG. 4
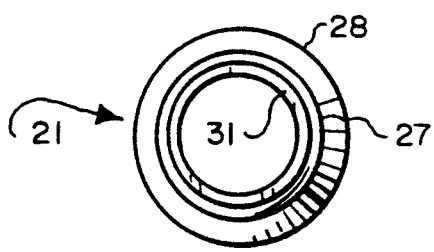
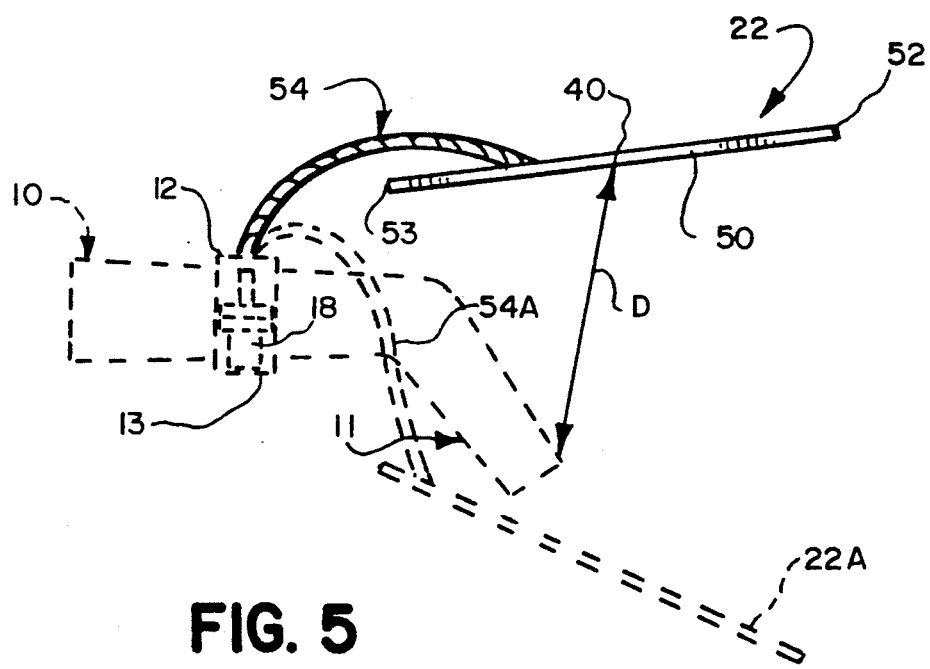
FIG. 5

SHIELD FOR MIG WELDER

CONTINUITY

This application is a continuation-in-part of my co-pending U.S. patent application Ser. No. 07/804,288, filed Dec. 6, 1991 now abandoned.

FIELD OF INVENTION

This invention relates to shields which protect the face and eyes of a user from the light, heat, and sparks which can be generated by a torch.

More particularly, the invention pertains to a protective shielding device which can readily be positioned above, below, and to either side of the tip of a welding torch to facilitate the use of the torch in a variety of awkward to reach positions.

In a further respect, the invention pertains to a shielding device of the type described which can be positioned in a wide variety of orientations near the tip of the torch so that the size of the shielding device is minimal.

PRIOR ART AND BACKGROUND

Safety shields for welding torches are well known in the art. See, for example, U.S. Pat. Nos. 2,390,149 to Hooper, 2,235,594 to Smith, and 1,217,838 to Schmidt. The shields are interposed between the torch tip and face of the user by securing the shields to the handle of the torch. Such prior art torches suffer from several disadvantages. First, the shields are not readily removed from the handle of the torch while the torch is in use or is hot after being used. The reason the shields are not readily removed is that removal of the tip typically requires that a set screw be loosened and the shield be slid off of the end of the torch. Loosening and sliding the shield off of the end of the torch while the tip is hot is awkward. Second, the prior art shields are not maneuverable to positions at all sides of the handle and tip of the torch unless, maybe, the shield is removed or loosened and repositioned on the handle. The ability to maneuver and position of the shield is important because during a welding job it is not uncommon to have to weld in awkward positions or locations which require that the position of the shield be altered. Third, the prior art shields cannot simultaneously be moved and maintained in a position near the tip of the torch to provide effective protection from the light, head, and sparks produced by the torch.

Accordingly, it would be highly desirable to provide an improved torch shielding device which could be readily repositioned on the torch while the torch is on has temporarily been turned off, which permits the shield to be repositioned at all sides of the torch without requiring loosening or removal of the shield from the handle of the torch, and, which can simultaneously be maneuvered on the torch and maintained in close proximity to the tip of the torch.

These and other, further and more specific objects and advantages of the invention will be apparent to those skilled in the art from the following detailed description thereof, taken in conjunction with the drawings.

BRIEF DESCRIPTION OF THE DRAWINGS

FIG. 2 is a side view illustrating a conical member utilized in the elongate flexible linkage means interconnecting the shield and handle of the torch in the device of FIG. 1;

FIG. 3 is a section view of the member of FIG. 2 taken along section line 2—2 thereof and further illustrating internal construction details thereof;

FIG. 4 is a top view illustrating the conical member of FIG. 2; and,

FIG. 5 is a side view illustrating an alternate embodiment of the invention.

DETAILED DESCRIPTION

Figure 1:
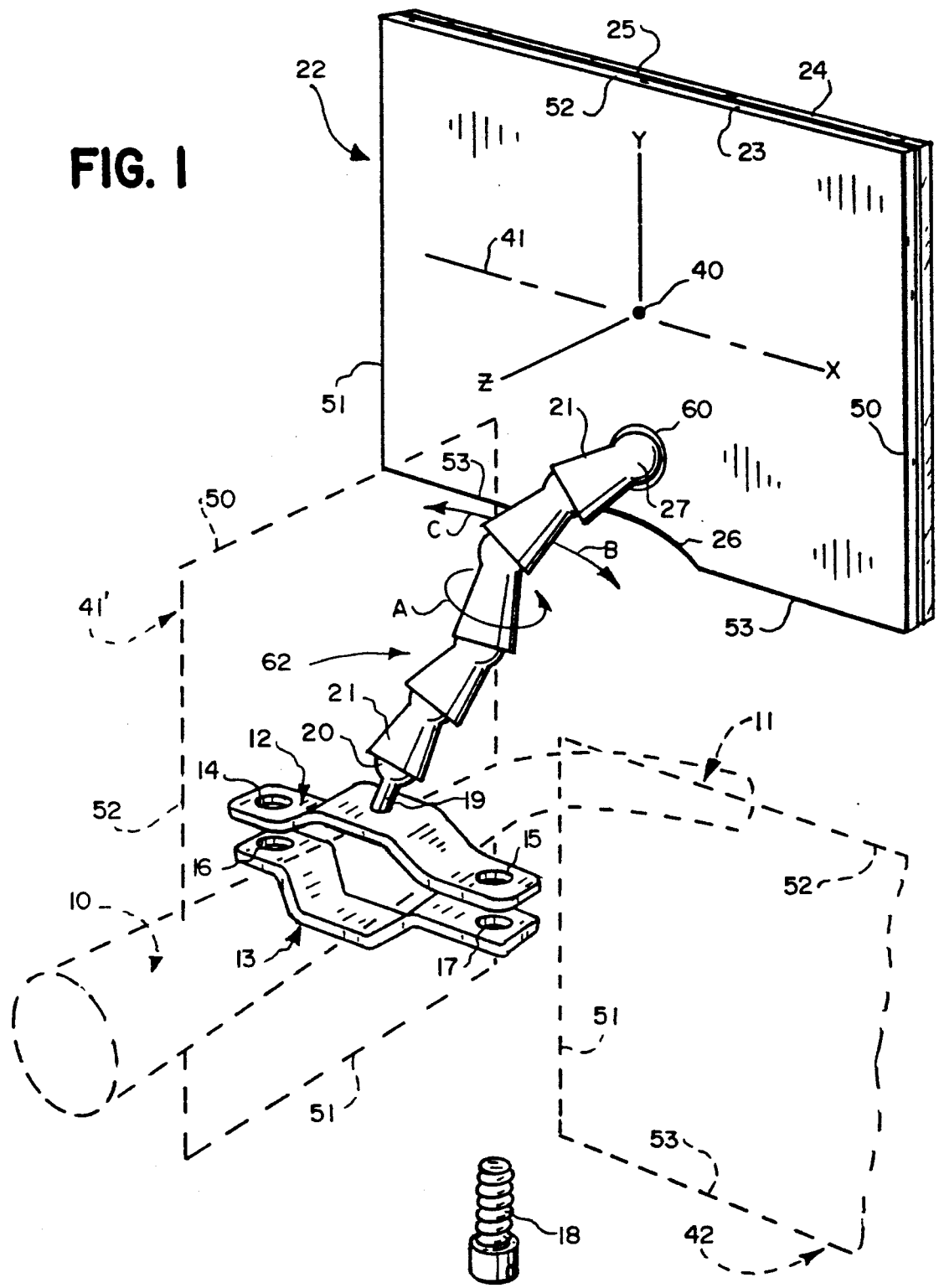
FIG. 1 is a perspective view illustrating a shielding device constructed in accordance with the principles of the invention.

Briefly, in accordance with my invention, I provide a shielding device for a welding torch. The torch includes a handle and a tip extending from the handle. The shielding device includes a shield having a centerpoint and a longitudinal axis passing through said centerpoint; elongate flexible linkage means having a first end attached to the shield and having a second end; and means for fastening the second end to a selected point on the handle of the welding torch. The linkage means is shaped and dimensioned such that the linkage means can be bent and twisted to position selectively the longitudinal axis parallel to each of three orientation axes and rotate the shield about each of the orientation axes. Each of said three orientation axes is perpendicular to the other two remaining ones of the orientation axes.

In another embodiment of my invention, I provide a shielding device for a welding torch. The welding torch includes a handle and a tip extending from the handle. The shielding device includes a shield having a centerpoint and a longitudinal axis passing through the centerpoint; elongate flexible linkage means having a first end attached to the shield and having a second end; and means for fastening the second end to a selected point on the handle of the welding torch. The linkage means is shaped and dimensioned such that when the fastening means secured the second end to the handle and the handle and the tip are maintained fixed in a selected position, the shield can be moved between at least three operative positions. The three operative positions include a first operative position with the longitudinal axis of the shield horizontally oriented in a position above the handle and the tip; a second operative position with the longitudinal axis vertically oriented in a position on one side of the handle and the tip and extending from beneath the handle upwardly past and above the handle; and, a third operative position with the longitudinal axis vertically oriented in a position to the other side of the handle and the tip and extending from beneath the handle upwardly past and above the handle.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a shielding device constructed in accordance with the principles of the invention and including a shield 22, elongate flexible linkage means 62, and means 12, 13 for fastening the linkage means to the handle 10 of a welding torch. The tip 11 of the torch extends outwardly from handle 10. The fastening means includes an upper bracket 12 having apertures 14, 15 formed therethrough and a lower bracket having apertures 16, 17. Each aperture pair 15-17 and 14-16 receive a screw 18 which secures the brackets to the handle 10. Post 19 is fixedly attached to and outwardly depends from bracket 12. The distal end of post 19 is secured to spherical member 20. Member 20 is shaped and dimensioned to rotatably snap into a spherical socket 29 formed in link member 21.

Linkage means 62 is comprised of a series of interconnected members 21. A link member 21 is illustrated in FIGS. 2 to 4 and includes outer conical surface 28, outer spherical surface 27, inner spherical surface 29, inner circular edge 30, and circular lip 31. Surface 29 and edge 30 are shaped and dimensioned such that surface 27 snaps past edge 30 and into contact with surface 29 for rotation inside surface 29. When the surface 27 of a first member 21 is snapped into a host link member 21 into contact with a surface 29 of the host link member, surface 27 and the first link member 21 can be rotated or twisted over surface 29 of the host member 21 in a direction about the longitudinal axis of the first link member. This kind of twisting movement is generally indicated by arrow A in FIG. 1. The longitudinal axis of a member 21 is indicated by dashed line L in FIG. 3. Similarly, surface 27 of the first link member can be rotated over surface 29 of the host member 21 in a direction about an axis which is perpendicular to the longitudinal axis of the first link member. This kind of rotational movement is generally indicated, by way of example, by arrows A and B in FIG. 1.

The longitudinal axis of shield 22 is indicated by line 41 in FIG. 1 and is parallel to orientation axis X. Each of the orientation axes X, Y, and Z is perpendicular to the remaining two of the orientation axes. In the event shield 22 is circular or square and has no apparent longitudinal axis, any axis which is generally parallel to the face of the shield can be selected to serve as the longitudinal axis.

In FIG. 1, transparent clear plastic panel member 24 and opaque smoky colored plastic panel member 23 bound a layer 25 of reflective gold material to form shield 22. Laminate shield 22 includes upper edge 52, lower edge 53, and side edges 50 and 51. Panel member 24 comprises the face of shield 22. Outer spherical surface 27 of a member 21 is fixedly secured to member 23 by adhesive 60.

Linkage means 62 can be bent or twisted in virtually any direction and is long enough and positioned on handle 10 such that shield 22 can be positioned to one side of handle 10 in the manner indicated by dashed lines 41 or the other side of handle 10 in the manner indicated by dashed lines 42 in FIG. 1. As indicated in FIG. 1, when shield 22 is lowered to one side of handle 10, the shield 22 can maintained the same orientation illustrated by solid lines in FIG. 1 (i.e., in the position indicated by dashed lines 42, the shield has the same orientation as the shield illustrated by solid lines in FIG. 1), or, the shield can be rotated to a new orientation (i.e., in the position indicated by dashed lines 41, the shield has been rotated ninety degrees from the position of the shield illustrated by solid lines in FIG. 1). The arcuate groove 26 formed in the bottom of the shield facilitates the rotation of the shield around handle 10 and tip 11.

In the practice of the invention it is important that the centerpoint 40 of the shield be positioned within two to three inches of the tip 11 of the torch. The close proximity of the shield 22 to tip 11 helps insure that shield 22 effectively blocks light, sparks, and heat and also helps minimize the size of the shield required. In the practice of the invention, the area of the face of the shield (of panel 24) can be twenty five square inches or less. As indicated in FIG. 5, it is preferred that the distance D from the centerpoint 40 to the tip 11 be only two to three inches.

Since each surface 27 can be snap fit into and out of each surface 29, shield 22 is readily removed from handle 10 by pulling a selected surface 27 of a member 21 out of the socket (surface 29) of the host member.

In FIG. 5, a pliable twistable metal member 54 has been substituted for linkage means 62 to interconnect bracket 12 and shield 22.

In FIG. 1, shield 22 can be rotated about centerpoint 40 and orientation axis Z three hundred and sixty degrees. Linkage means 22 also permits shield 22 to be positioned with longitudinal axis 41 parallel to any selected one of orientation axes X, Y, and Z and then, while axis 41 is maintained parallel to said selected one of the orientation axes, permits shield 22 to be rotated around said selected one of orientation axes X, Y, and Z. Shield 22 can be rotated around each axis X, Y, and Z through at least 45 degrees, and normally more, in this fashion. By twisting shield in the manner indicated by arrow A and downwardly adjusting linkage means 62, shield 22 can be moved from the position above handle 10 shown in FIG. 1 in solid outline to a position actually below handle 10. Such a position below handle 10 is illustrated by dashed lines 22A in FIG. 5.

Having described my invention in such terms as to enable those skilled in the art to understand and practice it, and having identified the presently preferred embodiments thereof, I claim:

1. A shielding device for a welding torch having a handle and a tip extending from the handle, said shielding device comprising:
   (a) A shield comprising a centerpoint and a longitudinal axis passing through said centerpoint;
   (b) elongate flexible linkage means comprising a first end attached to said shield and a second end;
   (c) means for fastening said second end to a selected location on said handle of said welding torch;
   said linkage means a plurality of rigid links respectively joined together in series by spaced adjustable connectors for individual and collective manual three dimensional location and relocation of at least some of the links in respect to others of the links by manual change at the adjustable connectors to position and reposition the shield in space as desired from time to time.

2. A shielding device for a welding torch having a handle and a tip extending from the handle, said shielding device comprising:
   (a) a shield comprising a centerpoint and a longitudinal axis passing through said centerpoint;
   (b) elongate flexible linkage means comprising a first end attached to said shield and a second end;
   (c) means for fastening said second end to a selected location on said handle of said welding torch;
   said linkage means comprising a plurality of spaced discrete couplings each of which is manually adjustable for movement of the shield to any desired three dimensional position, including but not limited to:

(d) a first operative positive with said longitudinal axis horizontally oriented in a position above said handle and said tip;

(e) a second operative position with said longitudinal axis vertically oriented in a position on one side of said handle and said tip and extending from beneath said handle upwardly past and above said handle; and, (f) a third operative position with said longitudinal axis vertically oriented in a position to the other side of said handle and said tip and extending from beneath said handle upwardly past and above said handle.

3. A shielding device for a welding torch having a handle and a tip extending from said handle, said shielding device comprising:

(a) a laminate shield comprising:
 (i) a first layer of opaque material,
 (ii) a second layer of light transparent material, and
 (iii) a layer of light reflective material intermediate said first and second layers, and
 (iv) hollow joint attached to said shield;

(b) elongate linkage means having a first end and a second end and comprising a series of rigid links successively connected by a plurality of spaced, discrete manually adjustable position-retaining joints;

(c) means for attaching said second end to a selected point on said handle such that said linkage means can be positioned so said second layer of said shield faces said tip.

4. A shielding device for a welding torch comprising a handle and a tip extending from the handle, said shielding device comprising:

(a) a shield having a centerpoint and a longitudinal axis passing through said centerpoint;

(b) elongate flexible linkage means comprising a plurality of discrete interconnected links and having a first end attached to said shield and having a second end;

(c) means for fastening said second end to a selected point on said handle of said welding torch;

said linkage means further comprising several spaced discrete connector means, each discrete connector means comprising means for separating and reattaching one link from an adjacent link centrally remote from both the first and second ends of the linkage means such that the shield and one part of the linkage means are disconnected from said handle and a second part of the linkage without disconnecting said fastening means from said handle and without disconnecting the shield from the linkage means;

each spaced discrete connector means of said linkage means comprising multi-directionally pivoting means for spacially setting and resetting the linkage means for three dimensionally positioning and repositioning the shield from time-to-time without separating any of the links and without disconnecting either the fastening means or the attachment to the shield.

5. A shielding device for a welding torch, said welding torch including a handle and a tip extending from the handle, said shielding device comprising:

(a) a shield having a centerpoint and a longitudinal axis passing through said centerpoint;

(b) elongate flexible linkage means comprising a plurality of interconnected links and having a first end attached to said shield and having a second end;

(c) means for fastening said second end to a selected point on said handle of said welding torch;

said linkage means further comprising means for separating and reattaching at least one link from an adjacent link of said elongate flexible linkage means such that the shield is disconnected from said handle of said welding torch without disconnecting said fastening means from said handle;

said linkage means being shaped and dimensioned such that said linkage means can, while said fastening means remains in fixed position on said handle, be bent and twisted to position selectively said longitudinal axis parallel to each of three mutually perpendicular orientation axes and rotate said shield about each of said orientation axes;

said separating means comprising means for separating at least two links from adjacent links to remove a section of said linkage means and means for reattaching the linkage means with the section removed to shorten the length of the linkage means.

6. A shielding device for a welding torch, said welding torch including a handle and a tip extending from the handle, said shielding device comprising:

(a) a shield having a centerpoint and a longitudinal axis passing through said centerpoint;

(b) elongate flexible linkage means comprising a plurality of interconnected links and having a first end attached to said shield and having a second end;

(c) means for fastening said second end to a selected point on said handle of said welding torch;

said linkage means further comprising means for separating and reattaching at least one link from an adjacent link of said elongate flexible linkage means such that the shield is disconnected from said handle of said welding torch without disconnecting said fastening means from said handle;

said linkage means being shaped and dimensioned such that said linkage means can, while said fastening means remains in fixed position on said handle, be bent and twisted to position selectively said longitudinal axis parallel to each of three mutually perpendicular orientation axes and rotate said shield about each of said orientation axes;

said separating means comprising means for attaching to an inserted length of additional links to effectively increase the length of the linkage means without disconnecting said fastening means from said handle.

7. A method for changing the orientation of a shielding device relative to a welder tip and handle to which the shielding device is attached comprising the steps of:
providing a welder comprising a tip and a handle;
placing a plurality of links in series and tri-dimensionally adjustably connecting successive links together at link connecting sites to form a linkage support;
attaching the shielding device to one end of the linkage support and securing a second end of the linkage support to a selected point on said handle of said welding torch;
positioning and repositioning the shield relative to the tip by three dimensionally adjusting the relationship of successive links at at least two of the link connecting sites.

8. A method according to claim 7 comprising the additional step of:

separating one link from the next link at the connecting site therebetween to detach the shield from the handle.

9. A method for changing the orientation of a shielding device relative to a welder tip and handle to which the shielding device is attached comprising the steps of:

providing a welder comprising a tip and a handle;

attaching the shielding device comprising a shield having a centerpoint and a longitudinal axis passing through said centerpoint, an elongate flexible linkage means comprising a plurality of interconnected links and having a first end attached to said shield and having a second end and means for fastening said second end to a selected point on said handle of said welding torch to the handle of the welder;

bending and twisting the elongate flexible linkage means and rotating the shield about the longitudinal axis of the elongate flexible linkage means to reposition the shield relative to the tip;

separating a first link from a second link of the flexible linkage means to detach the shield from the handle;

interconnecting an additional section of flexible linkage interposed between said first and second links to lengthen said elongate flexible linkage means.

10. A method for changing the orientation of a shielding device relative to a welder tip and handle to which the shielding device is attached comprising the steps of:

providing a welder comprising a tip and a handle;

attaching the shielding device comprising a shield having a centerpoint and a longitudinal axis passing through said centerpoint, an elongate flexible linkage means comprising a plurality of interconnected links and having a first end attached to said shield and having a second end and means for fastening said second end to a selected point on said handle of said welding torch to the handle of the welder;

bending and twisting the elongate flexible linkage means and rotating the shield about the longitudinal axis of the elongate flexible linkage means to reposition the shield relative to the tip;

separating a first link from a second link of the flexible linkage means to detach the shield from the handle;

separating a third link from a fourth link thereby defining a section of the elongate flexible linkage means including said second and third links which is separated from other parts of the elongate flexible linkage means;

connecting the first link to the fourth link to effectively shorten the length of the elongate flexible linkage means.

11. A welding assembly comprising:

a welding torch;
a welding shield;
a series of at least three links, each two successive links being joined together by a tri-dimensionally adjustable connector, the series of connected links spanning between the torch and the shield;
the one end of the series of connected links comprising means proximally anchored to the torch, the other end of the series of connected links comprising means distally anchored to the shield whereby the links can be physically relocated at the tri-dimensionally adjustable links in space from time to time to place the shield between a workpiece and a user of the torch as desired without altering the anchor at either end.

12. A welding assembly according to claim 11 wherein the tri-dimensionally adjustable connectors accommodate angular and rotational repositioning of the links one in respect to the other by which the shield can be rotated and linearly repositioned without altering the anchor at either end.

13. A welding assembly according to claim 12 wherein the ends of juxtaposed links are nested together at each tri-dimensionally adjustable connector.

14. A welding assembly according to claim 12 wherein the ends of the links comprise interconnected ball and socket means which comprise the adjustable connectors.

15. A method of selectively positioning and repositioning a shield in relationship to a welding torch to protect a user of the torch comprising the steps of:

proximally connecting a shield support to the welding torch;

distally connecting the shield support to the shield;

causing the shield support to define seriatim at least three links comprising a three-dimensionally adjustable pivotal joint between each two consecutive links;

adjusting the spacial location of the shield by manipulating the links at the pivotal joints to position and reposition the shield between a workpiece and the user to prevent injury without altering either the proximal and the distally connections to the welding torch and shield, respectively.

16. A method according to claim 15 wherein the adjusting step comprises changing the effective length between the two connection sites by changing the angular spacial relationship between the links at the pivotal joints.

17. A method according to claim 15 wherein the adjusting step comprises rotating the links at the pivotal joints.

18. A method according to claim 15 wherein the adjusting step comprises pivoting at least one two links at the pivotal joints.

* * * * *